INVENTOR
Russell T. Murray
BY
Fisher & Swain
ATTORNEYS

Aug. 14, 1951   R. T. MURRAY   2,564,496
STEP DRILL GRINDER
Filed July 12, 1948   7 Sheets-Sheet 3
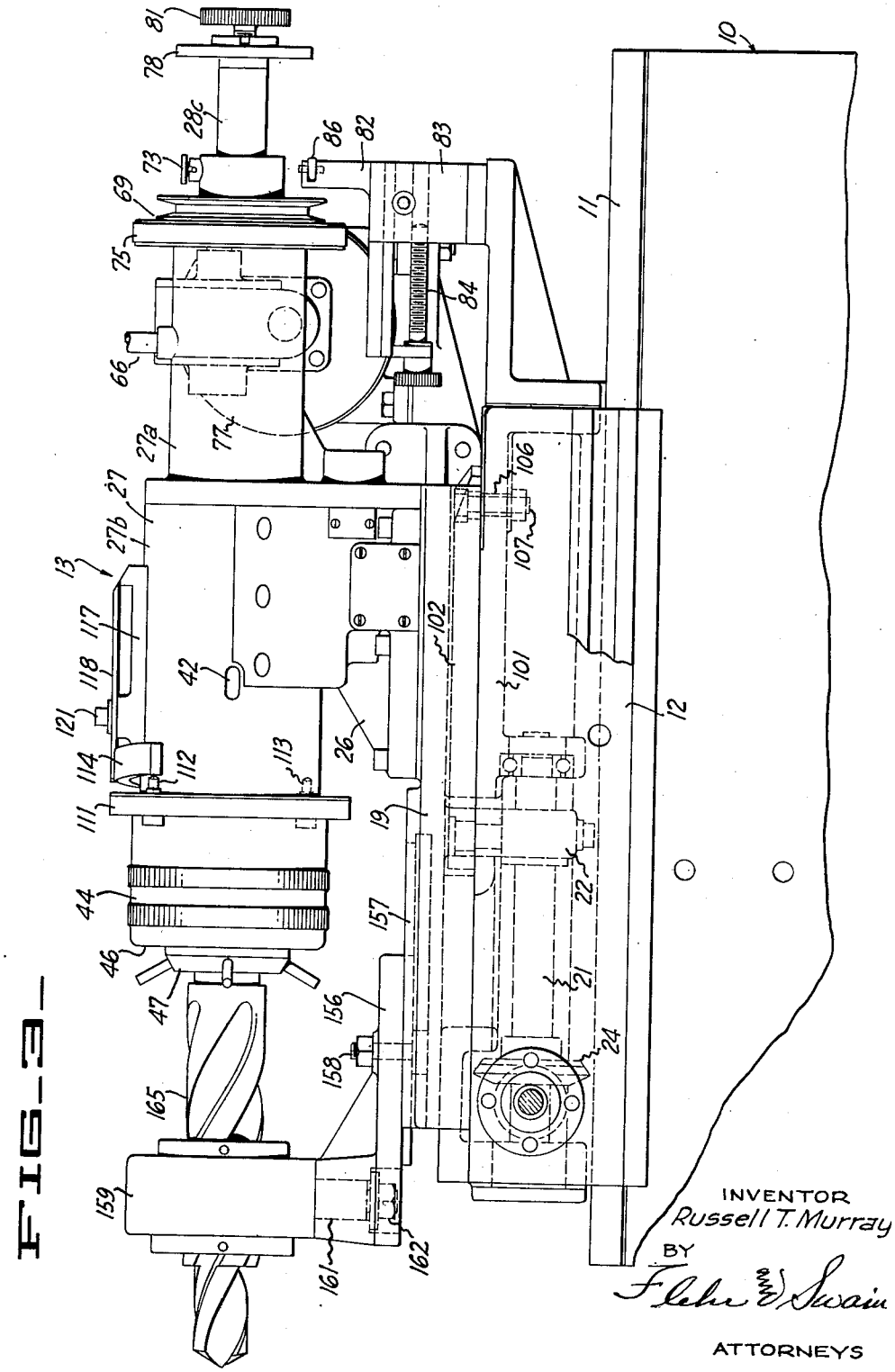
INVENTOR
Russell T. Murray
BY
ATTORNEYS

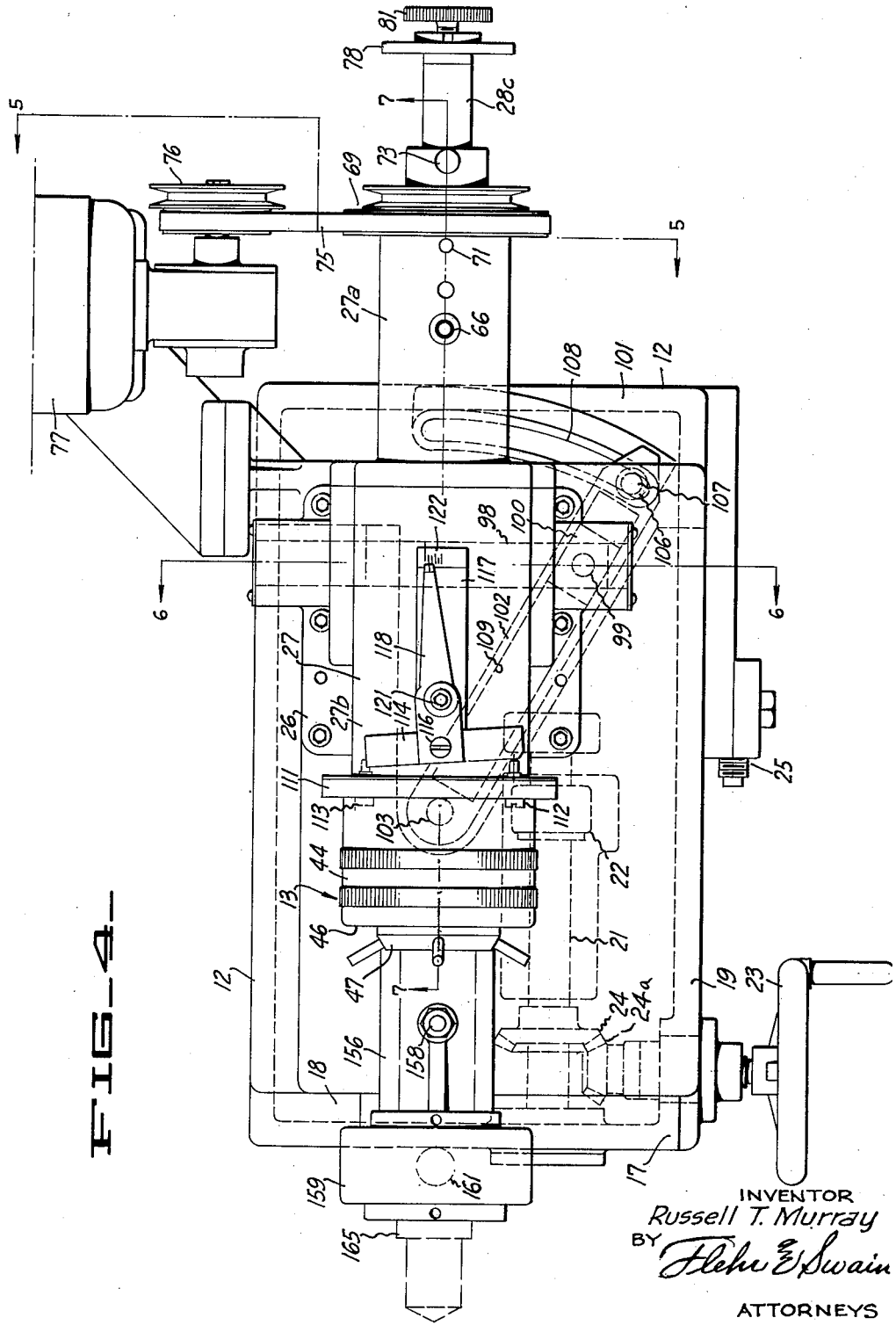

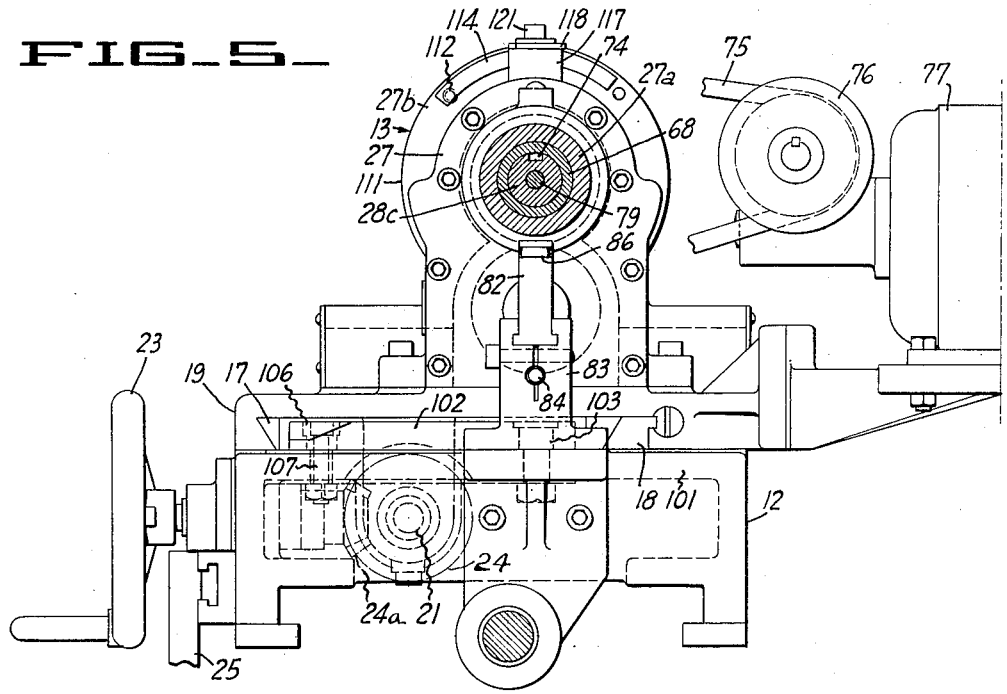
FIG_5_
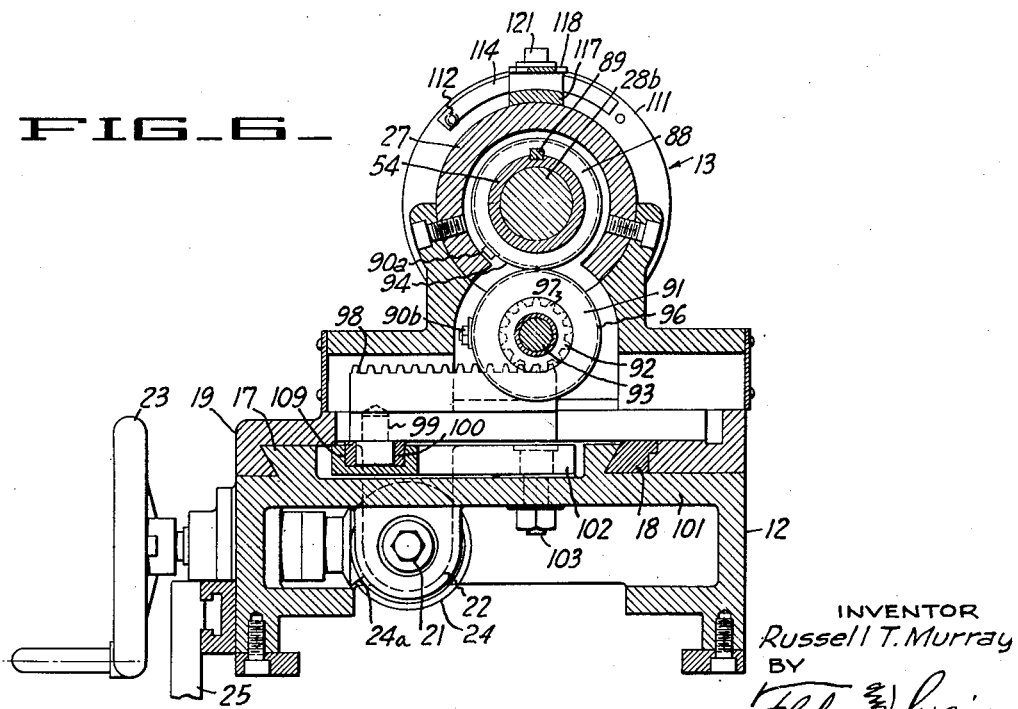
FIG_6_
INVENTOR
Russell T. Murray
BY
Flehr & Swain
ATTORNEYS Aug. 14, 1951  R. T. MURRAY  2,564,496
STEP DRILL GRINDER Filed July 12, 1948  7 Sheets-Sheet 6

INVENTOR
Russell T. Murray
BY
Flehr & Swain
ATTORNEY

Aug. 14, 1951 R. T. MURRAY 2,564,496
STEP DRILL GRINDER
Filed July 12, 1948 7 Sheets-Sheet 7
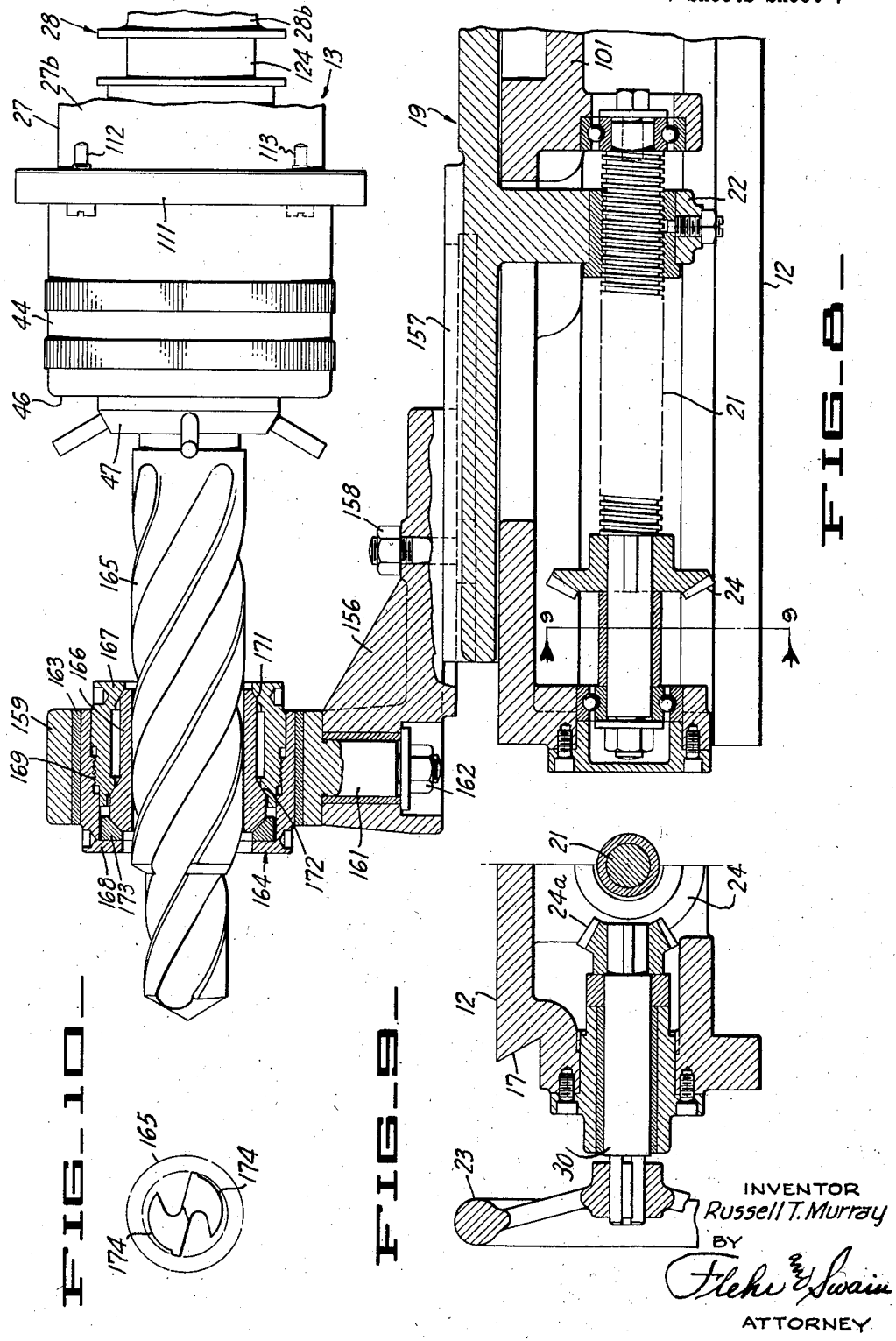
INVENTOR
Russell T. Murray
BY
Flehr & Swain
ATTORNEY Patented Aug. 14, 1951

2,564,496

UNITED STATES PATENT OFFICE 2,564,496

STEP DRILL GRINDER

Russell T. Murray, Rockport, Ind., assignor, by mesne assignments, to Grove Regulator Company, a corporation of California Application July 12, 1948, Serial No. 38,269

3 Claims. (Cl. 51—219)

This invention relates generally to machines for grinding twist drills of the step type. The invention is applicable to both the manufacture of step drills from twist drill stock, and to their sharpening or reconditioning.

The larger manufacturers of twist drills are equipped with elaborate expensive grinding machinery for the manufacture and reconditioning of twist drills of the step type (i. e., drills having cutting edges on two or more diameters). Because of the difficulties and extra machining operations required such drills sell at a premium price. Most shops or manufacturing establishments making use of step drills have no adequate facilities for their sharpening or reconditioning. As a result the drill costs involved in certain machining operations may amount to a considerable factor, and may preclude or minimize their use in many operations in which they could be used to great advantage, if adequate means could be provided for their economical reconditioning.

Less expensive machines for grinding step drills have been available for shop use, but they have been relatively impractical and uneconomical. Because of the inconvenience with which the various operations can be carried out on the machines, the cost to the average shop has been excessive, and great skill must be exercised by the operator of the machine in order to secure accurate results. In particular it has not been possible with such machines to carry out the various grinding operations without time consuming readjustment or resetting of the machine.

It is an object of the present invention to provide a machine for the grinding of step drills which will enable the grinding operations to be carried out with great facility compared to prior available machines.

A further object of the invention is to provide a machine of the above character which will enable one to carry out a complete sequence of required grinding operations without a resetting of the machine.

Another object of the invention is to provide a machine of the above character which can be readily adjusted for the particular skew of the drill, and which enables the same adjustment to be used in the grinding of one or more steps.

Another object of the invention is to provide a machine of the above character, which is provided with means whereby after grinding a length of the drill stock to proper length, the same can be operated to turn and advance the drill against the grinding wheel to produce the desired cutting edges and clearance for the step shoulder of the drill.

Additional objects of the invention will appear from the following description in which the preferred embodiment of the invention has been set forth in detail in conjunction with the accompanying drawing.

Referring to the drawing:

Figure 3 is a side elevational view of a part of the machine, namely the drill supporting head.

Figure 4 is a plan view of the drill supporting head as illustrated in Figure 3.

Figure 5 is a cross-sectional view taken along the line 5—5 of Figure 4.

Figure 6 is a cross-sectional view taken along the line 6—6 of Figure 4.

Figure 8 is a sectional detail showing the hand operated feed screw.

Figure 9 is a cross-sectional view taken along the line 9—9 of Figure 8.

Figure 10 is an end view of a step type drill.

Figure 1:
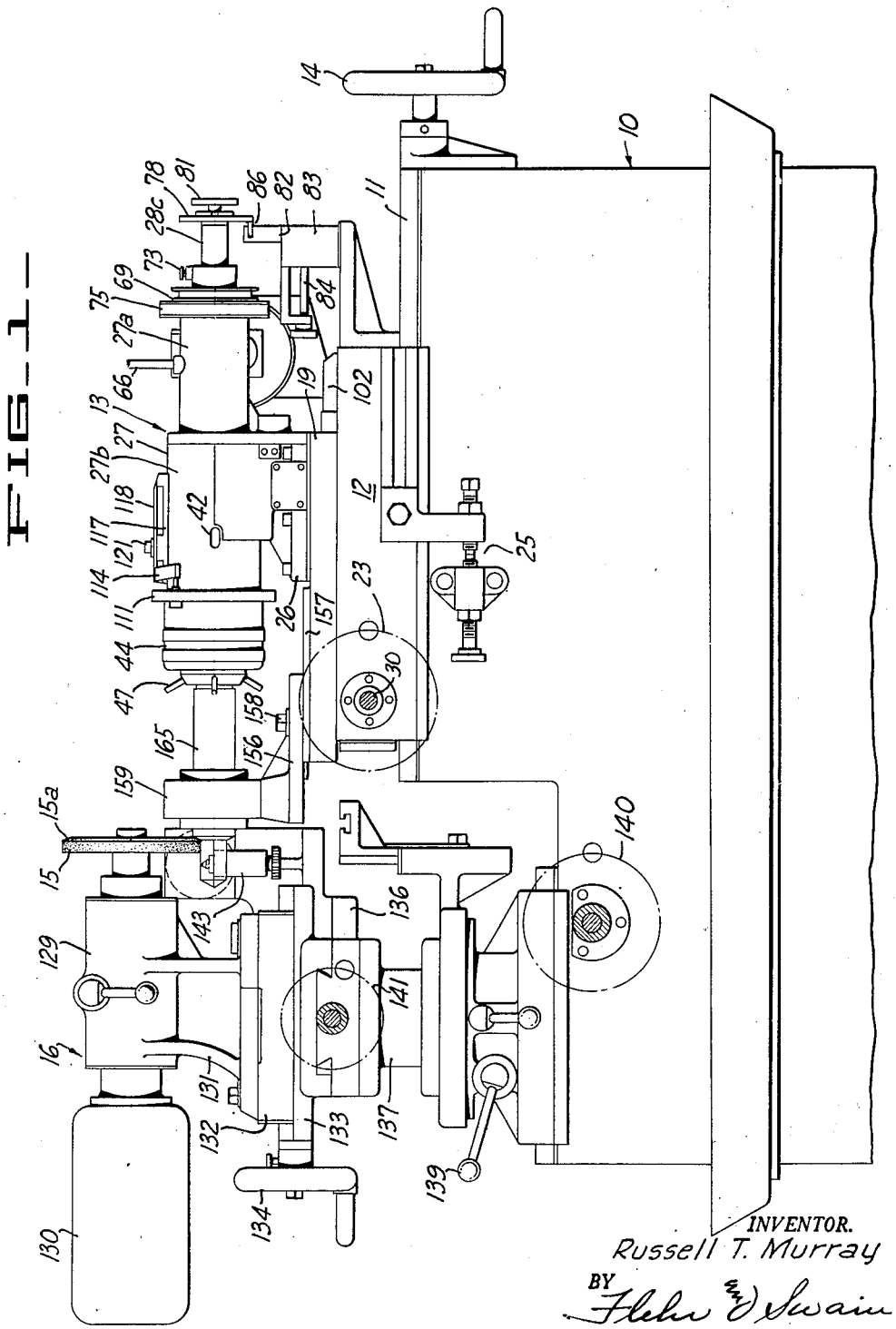
Figure 1 is a side elevational view illustrating a grinding machine incorporating the present invention.

The machine as illustrated in the drawing consists generally of a supporting frame 10 providing horizontal ways 11 and upon which the carriage 12 is slidably mounted. This carriage serves to mount the drill supporting head 13, and its position along the length of the machine can be adjusted by a conventional feed screw and hand wheel 14. The head 13 is adapted to receive the drill to be ground, and in the various operations of the machine the drill is advanced against the grind wheel 15 of the grinding head 16.

The upper side of the casting forming the carriage 12 is formed to provide the longitudinally extending ways 17 and 18, which serve to slidably mount the plate 19. Suitable means is provided whereby the plate 19 can be moved along the ways 17 and 18. Thus a feed screw 21 is mounted within the carriage 12, and is engaged by nut 22, which in turn is secured to the plate 19. A hand wheel 23 is positioned at the front of the machine, and is attached to a shaft 30 which extends from the carriage. This shaft is operatively connected with the feed screw 21 through the bevel gears 24 and 24a. Thus upon turning the hand wheel 23 the head 13 can be moved to the left or to the right as viewed in Figure 1. An adjustable stop 25 serves to limit movement of the carriage 12 to the left.

Plate 19 serves to mount a supporting bracket 26, which in turn carries the spindle enclosing housing 27. This housing can be conveniently formed of a number of separable parts including the rear section or part 27a and the main section or part 27b. Extending axially within the housing 27 there is a spindle 28 which on its forward end is associated with means for receiving the drill stock and which, as will be presently explained, is associated with clutching means for operatively connecting the same with precision turning means.

The forward part of the spindle 28 is formed to provide the tubular portion 28a, and this portion is rotatably fitted in a bushing 29, which in turn is attached to the adjacent end portion of the housing part 27b. A suitable thrust bearing assembly 31 is interposed between housing part 27b and the sleeve portion 28a, to take thrust forces which may be applied to the spindle tending to urge the same to the right as viewed in Figure 7. Within the sleeve portion 28a of the spindle there is a socket sleeve 32, which is bored to receive the shank 33 of a drill. Socket sleeve 32 is provided with diametrically opposed keys 34, slidably accommodated in the grooves 36 formed in the spindle portion 28a. Thus socket sleeve 32 may move a limited amount longitudinally of the spindle, but is always keyed to the spindle for concurrent rotation with the same.

At its rear end the socket sleeve 32 is shown provided with a recess 37 for receiving the flattened end portion 38 of the drill shank. Portion 38 is adapted to abut the pin 39, which is received in a bore 41 provided in the spindle. An opening 42 is provided in the spindle whereby a wedge can be inserted in this opening, for driving pin 39 against the shank of the drill, to thereby positively eject the same.

A cup-shaped shell or barrel 44 is rotatably fitted upon the adjacent end of the spindle housing 27b, and its end wall 46 has an opening to accommodate the socket sleeve 32. The projecting end of the socket sleeve is threaded to receive the locking nut 47. A compression spring 48 is disposed between the socket sleeve 32 and the spindle part 28a, and its one end is seated upon the end of the bushing 49, which is locked as by screws 51 to the spindle part 28a. The other end of the spring is seated against an annular shoulder formed by the shoulder part 52, which is attached to the adjacent end portion of the socket sleeve 32. By loosening nut 47 it is possible to unlock the spindle with respect to the cup-shaped shell 44, thus permitting the latter to be turned to a different angular position relative to the spindle and to the drill carried by the same.

Figure 7:
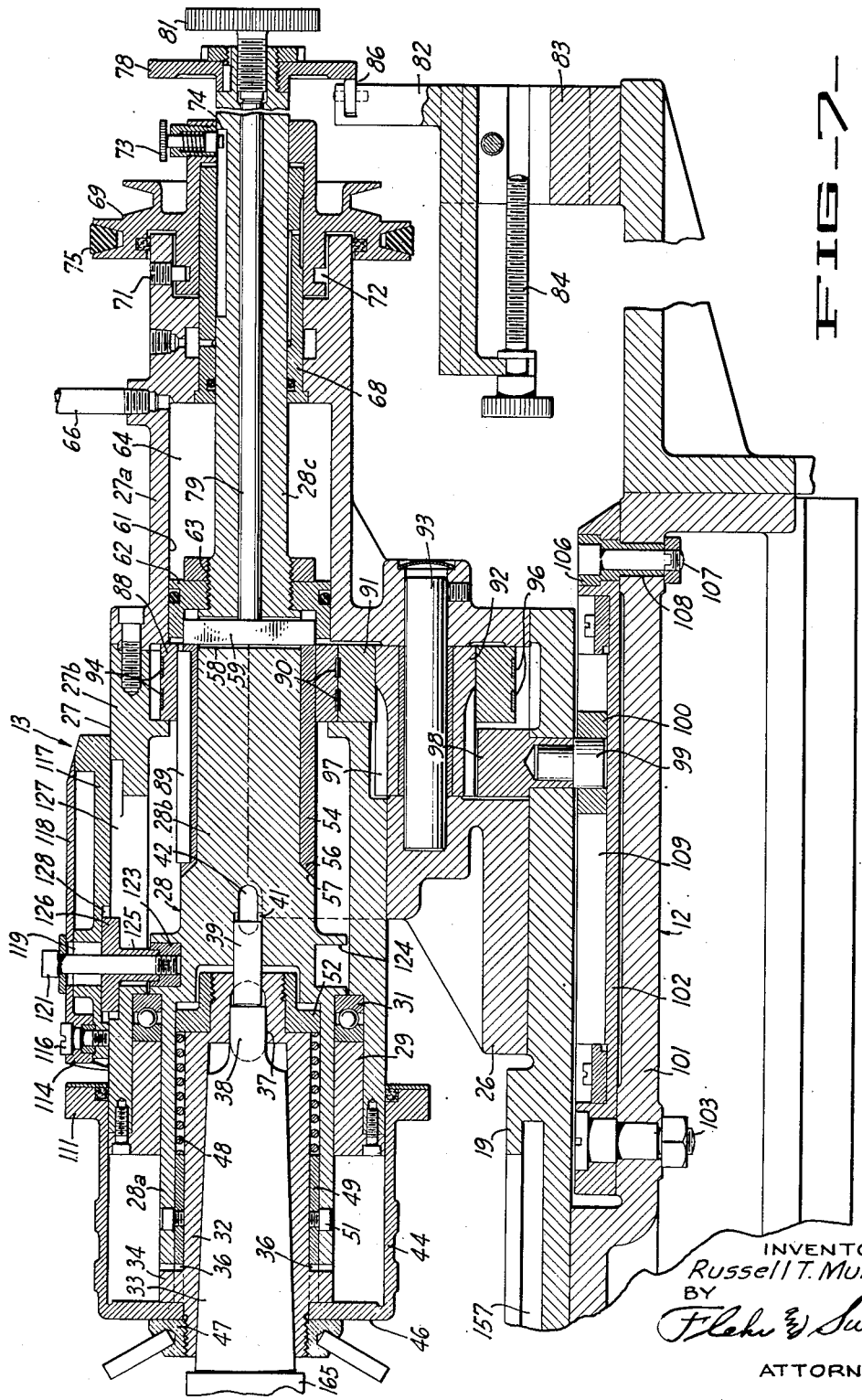
Figure 7 is a cross-sectional view taken along the line 7—7 of Figure 4.

It will be noted that all of the parts just described are constructed in such a manner that the spindle 28 is free to move a limited distance to the right from the extreme left hand position illustrated in Figure 7. Such movement is accommodated by movement of the shell 44 over the adjacent end of the housing part 27b, and by sliding the spindle part 28a through the bushing 29.

The main spindle part 28b is machined to loosely accommodate a sleeve 54. This sleeve forms in effect one part of a clutch, and its end portion 56 is formed beveled as illustrated, and is adapted to be frictionally engaged or disengaged with respect to the beveled shoulder 57, formed on the spindle part 28b. Adjacent the right hand end of the sleeve 54 as viewed in Figure 7, the spindle is provided with diametrically extending openings 58, which accommodate the key bar 59. The end portions of key 59 abut the adjacent end of the sleeve 54, whereby when the key is urged to the left as viewed in Figure 7, sleeve 54 is urged in a direction to force the clutch surfaces 56 and 57 into driving engagement.

The interior of the housing part 27a forms a cylinder bore 61, which is fitted with a pneumatic piston 62. This piston has threaded engagement 63 with the spindle portion 28b, whereby air pressure applied to the space 64 at one side of the piston 62 serves to urge the piston together with the entire spindle toward the left. A pipe 66 connects with the space 64, and leads to a source of air under pressure, through a suitable operator controlled valve.

The spindle part 28c is journaled within a bushing 68, which in turn is fitted within the body part 27a. Bushing 68 also serves to journal the hub of a sheave 69, and the sheave is normally held in assembled relation on the machine by a pin 71, which extends into a groove 72. The hub of sheave 69 also has a retractable drive pin 73, the inner end of which is adapted to engage in a groove 74 formed in the spindle part 28c. Suitable drive means such as a V-belt 75 serves to operatively connect the sheave 69 with a sheave 76, which in turn is driven by the electric motor 77. This motor incorporates a speed reduction gearing to drive sheave 76 at a proper speed.

The rear end of the spindle part 28c carries a disc 78, which cooperates with movement limiting means to be presently described. Extending axially through the spindle part 28c there is a rod 79, one end of which abuts the key 59 and the other end of which can be engaged by the hand operated screw 81. Thus by turning the screw 81 rod 79 can apply sufficient thrust to the key 59 to force the frictional clutch surfaces 56 and 57 together.

The movement limiting means cooperating with the disc 78 includes the stop lug 82, which is slidably carried by the mounting bracket 83. By means of a threaded screw 84 which is threaded into the bracket 83, the stop lug 82 can be adjusted to the left or to the right as viewed in Figure 7. A small roller 86 is carried by lug 82, and is adapted to be engaged by the disc 78 to limit movement of the spindle to the left.

The precision turning means for the spindle includes a sheave 88, which is loosely mounted upon sleeve 54, and splined thereto by key 89. Below the sheave 88 there is a similar sheave 91 which is fixed on the hub 92, the latter being in turn journaled upon the shaft 93. Suitable end steel belts 90 (Figures 6 and 7) operate within the shallow grooves 94 and 96, which are formed on the peripheries of the sheaves 88 and 91. These belts are anchored to the peripheries of the sheaves 88 and 91 by the attaching means 90a and 90b. Instead of using sheaves together with such metal belts, one can employ directly meshing gears of proper accuracy.

The extending end portion 97 of the hub 92 is formed as a pinion, the teeth of which engage the teeth of a gear rack 98. This rack is guided for horizontal sliding movement at right angles to the axis of the spindle. The rack serves to mount a pin 99, which forms a journal for the cam follower block 100.

The upper wall 101 of the carriage 12 is recessed to accommodate a cam arm 102. One end of the arm 102 (Figures 4 and 7) is connected by pivot pin 103 with the top wall 101 of the carriage 12. The other end of the cam arm 102 carries a bushing 106 and a lock bolt 107. The bushing and lock bolt assembly extend through an arcuate slot 108 in the top wall 101 of the carriage 12. By means of a suitable wrench or other tool applied to the lock bolt 107, the corresponding end of the cam arm 102 can be adjusted to a desired position, to thereby position the angle of the cam arm relative to the longitudinal axis of the machine. The cam arm is provided with a linear cam groove 109, which serves to accommodate the cam block 100. Assuming that the cam arm 102 is set at a given angle with respect to the longitudinal axis of the machine (Figure 4), it will be evident that when the entire drill supporting head of the machine is moved to the left or to the right, that is toward or away from the grinding head, cam block 100 is caused to slide along the cam groove 109, thus moving the gear rack 98 laterally of the machine to impart rotary movement to the spindle through pinion 97, and sheaves 91 and 88. It may be explained at this point that the cam arm 102 can be set by the operator in accordance with the skew of a particular drill to be ground. Therefore for grinding operations to relieve the land of the drill it is possible to advance the drill stock against the grinding wheel with rotary movement corresponding to skew of the drill.

In order to facilitate the grinding of the cutting edges between the different drill diameters, means is provided for enabling rotary motion of the drill together with a predetermined amount of advancement of the drill and spindle, without however moving the entire head assembly or the sheaves 88 and 91. Thus the forward barrel 44 is provided with a flange 111, which is provided with spaced threaded openings to receive the cam pins 112 and 113, located 180° apart. Two pins are provided on the assumption that a double fluted twist drill is to be ground. Should a single fluted twist drill be ground then a single pin will suffice, or if a four fluted drill is being ground, then four pins must be provided located 90° apart. Pins 112 and 113 are adapted to engage the forward edge of an arcuate cam bar 114. This bar is pivotally attached by screw 116 to an adjustable mounting pad 117 which in turn is seated upon the housing part 27b. A pointer arm 118 is attached to and extends rearwardly from the cam bar 114. It is provided with an enlarged opening to accommodate the clamp screw 121. Upon loosening the screw 121 the pointer arm 118 can be moved between limiting positions, as may be indicated by graduations 122. A block 123 is attached to the inner end of screw 121, and fits within the annular groove 124 provided in the spindle 28. A spacer 125 is also carried by screw 121 and is provided with a flat key-like portion 126. This portion fits snugly with the milled housing slot 127 and the slot 128 in pad 117. Assuming that the arcuate cam bar 114 is disposed at an angle such as illustrated for example in Figure 4, and assuming that the spindle is disengaged (by release of the clutch) from driving relation with the sheaves 88 and 91, manual turning of the barrel 44 to bring one of the pins 112, 113 into operative engagement with the edge of cam bar 114, causes the barrel 44 together with the drill socket 32 to be advanced forwardly as it is rotated, such forward movement being accommodated by sliding of the socket sleeve 32 within the spindle part 28a, and being against the compression of spring 48. When the barrel 44 has been turned sufficiently far to disengage a particular pin 112, 113 from the cam bar 114, then the barrel together with the socket sleeve 32 returns to its initial position. Thus by means of such a manual operation, it is possible to carry out accurate grinding of the cutting edges between two different diameters of the step drill, as will be presently explained in greater detail.

In certain grinding operations the cam bar 114 must be moved to an out of the way position. This can be done by loosening screw 121 and then sliding mounting pad 117 a limited distance away from the barrel.

The grinding head 16 for the machine is preferably adjustable whereby the grind wheel 15 may be raised or lowered, adjusted laterally, and also adjusted with respect to the angle of its axis relative to the axis of the spindle. As representative of such an adjustable holder for the grind wheel, the wheel is shown mounted upon a shaft carried by the journal head 129, and driven by an electric or pneumatic motor 130. Journal 129 is a part of a journal mounting 131, which is carried by the plate 132 in such a manner as to enable angular adjustment about a vertical axis. Plate 132 slidably engages ways upon a plate 133, and hand wheel 134 in conjunction with conventional screw means, enables adjustment of the grinding wheel longitudinally of the machine. Plate 133 slidably engages laterally extending ways formed on the plate 136 and the latter member is a part of a supporting standard 137, which extends vertically and telescopes into the base 10 of the machine. A lock lever 139 is provided for locking the grinding head after its adjustment to a desired level. A suitable feed screw operative by the hand wheel 141, enables adjustment of the wheel in a direction laterally of the axis of the spindle, and as previously explained turning of hand wheel 134 serves to move the wheel in a direction longitudinally of the spindle axis. Hand wheel 140 operates through a conventional feed screw means for raising or lowering the entire head.

Figure 2:
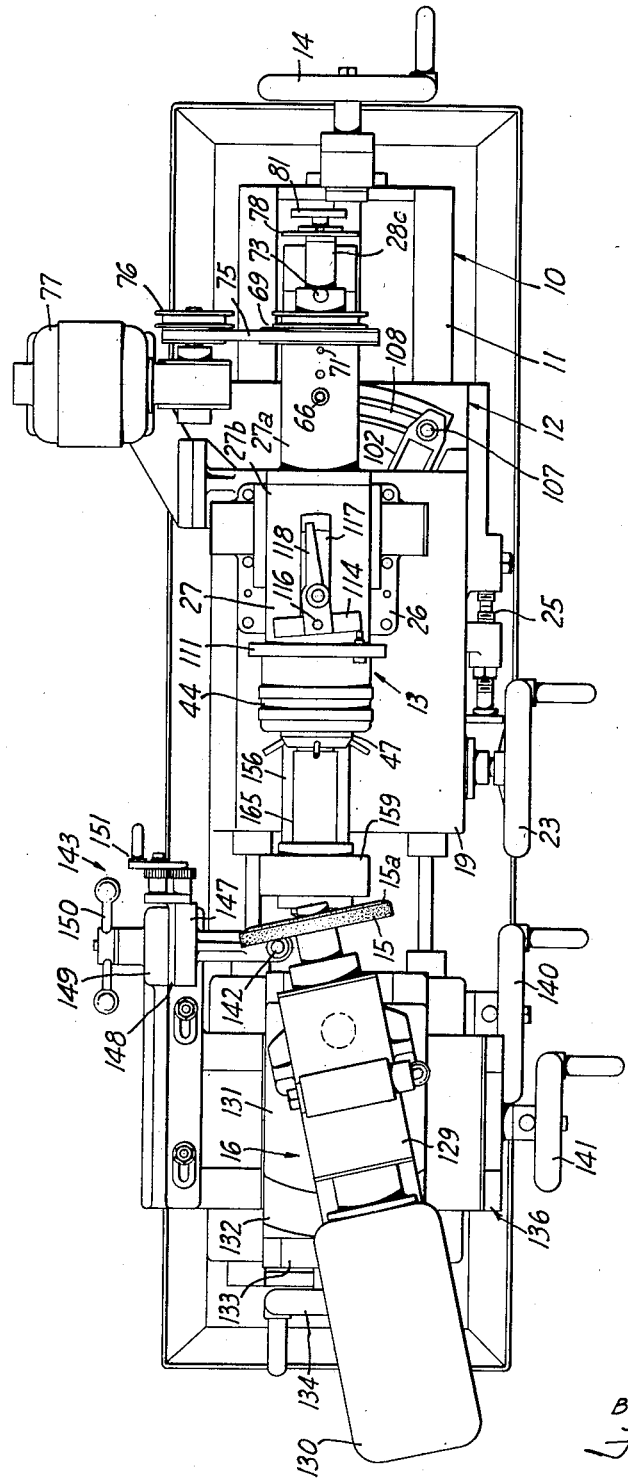
Figure 2 is a plan view of the machine shown in Figure 1.

It is desirable to provide a suitable dressing tool and a holder for the same in order to enable accurate dressing of the grind wheel. For this purpose there is shown a grind wheel dressing tool 142, mounted upon a suitable adjustable holder 143. The part 147 of the holder, which serves to mount the dressing tool 142, is slidably engaged with an adjacent part 148 (Figure 2), which in turn is adjustably clamped to the part 149. The adjustable engagement between parts 148, 149 enables angular adjustment about a horizontal axis extending transverse to the machine, and the parts can be clamped in a given angular position by hand wheel 150. Hand wheel 151 enables sliding adjustment between parts 147 and 148, whereby when the parts are in the position shown in Figure 2, turning of hand wheel 151 serves to move the dressing tool longitudinally of the machine. Normally the dressing tool is offset to one side of the axis of the spindle. The grind wheel can be shifted to a position directly over the dressing tool for a dressing operation.

A suitable steady rest is provided to more accurately hold the drill during grinding operations. This steady rest means includes the bracket 156 which is mounted upon ways 157 formed on the wall 19 (Figure 8). Clamping screw 158 enables locating of the bracket 156 at a desired point. An annular journal ring 159 is provided with a depending stud 161, which extends through the bracket 156 and is provided with a retaining nut 162. Ring 159 is fitted with a journal bushing 163, which in turn serves to journal an inner assembly 164 which is attached to the drill stock 165. The assembly 164 consists in this instance of the split collet 166 together with the interfitting clamping rings 167 and 168. Clamping ring 167 has threaded engagement 169 with the clamping ring 168, and also has beveled shoulders 171 and 172 which engage complementary beveled shoulders formed on the collet 166. Ring 168 urges the bevel of washer 173 against a beveled end of the collet 166 whereby when the two clamping rings 167 and 168 are turned in opposite directions by application of suitable tools, forces are applied to the collet 166 to contract the same to tightly grip the drill stock 165. A characteristic of this steady rest is that although it prevents lateral movement of the drill, the drill is free to turn and to move longitudinally of its axis.

Operation of my machine can be described as follows: Assuming first that it is desired to form a step drill from a standard single diameter drill, the shank of the drill is seated in the socket sleeve 32 and the steady rest is applied to the projecting stock 165 of the drill in the manner previously described. The twist drill stock is presumably formed to a single diameter and ground at its end to form two accurate cutting bits. The grind wheel is first adjusted to a position with its axis in a vertical plane coincident with the axis of the drill. Pipe 66 is connected to a source of air under pressure whereby the spindle is always urged toward the left as viewed in Figure 1. The positioning of the carriage 12 with respect to the base 10, and the positioning of the base plate 19 with respect to the carriage 12, is such that when the plate 19 is near the right hand limit of its movement relative to the carriage (Figure 1), and with the spindle in the position shown in Figure 7, the end of the drill stock is in proximity with the grinding wheel. Assuming that a single step drill is to be ground, the first operation is to rough grind the end of the drill stock to the smaller diameter. Thus the sheave 69 is operatively connected to the spindle by releasing the drive pin 73 to engage groove 74, and the electric motor 77 is set in operation. The gap between the stop disc 78 and the stop roller 86 is set to correspond to the length of the smaller diameter to be ground. The spindle carrying base 19 is now moved to the left to advance the stock against the grinding wheel, assuming, of course, that the grinding wheel is properly adjusted to take a cut. When a cut has been taken corresponding to the length of the smaller drill diameter being ground, disc 78 comes into engagement with the stop roller 86, thus preventing further advancement of the stock against the grinding wheel. The operator then returns the spindle carrying base 19 for another cut. One continues in this manner until one has arrived at substantially the diameter desired. The drill stock will at this time appear substantially as shown in Figure 3.

In place of using a square cornered grind wheel as indicated in the above explanation, for the preliminary rough grinding operation, it is possible to use a grind wheel having a beveled edge 15a, substantially as shown in Figure 1. When the drill stock is operated upon with such a beveled grind wheel, the result is shown in outline in Figure 10. It will be noted that the shoulder between the larger and smaller diameters of the stock is on a bevel, instead of being in a plane at right angles to the axis of the stock, as in Figure 3.

The operator now resets the position of the grind wheel whereby it is at an angle to a vertical plane coincident with the spindle axis, the angle corresponding to the angle of clearance desired in sharpening the lips of the shoulder. After setting the axis of the wheel at this angle, the wheel is shifted to a position directly overlying the dressing tool, and the dressing tool is then traversed across the face of the wheel in order that the wheel base may cut accurately on the smaller diameter, while at such an angle. At the same time the edge of the wheel may be dressed to provide the desired bevel, assuming that this bevel has not already been present.

With the grind wheel in operation the operator may now take one or more finishing cuts as desired on the smaller diameter. Then one proceeds to grind the shoulder between the different diameters, to provide the desired cutting edges with desired clearance. To carry out this phase of the grinding screw 121 is loosened and the pad 117 together with finger 118, is shifted to an operative position, with the finger 118 set at an angle depending upon the clearance desired. Screw 121 is then tightened to clamp the parts together. Cam bar 114 will then occupy a position substantially as shown in Figure 4. One of the pins 112, 113, as for example the former, should occupy a position adjacent the entrant end of the cam 114, when the drill stock is in a proper angular position to be advanced for the shoulder grinding operation. The operator then manually turns the barrel 44 in a clockwise direction as viewed from the shank end of the drill, thereby causing the drill stock to rotate and to simultaneously be advanced against the bevel of the grind wheel, at a rate determined by the angular positioning of the cam bar 114. When the engaged cam pin has passed the cam bar 114, the drill stock is rapidly retracted. Then the barrel 44 is turned sufficiently far to bring the second cam pin into engagement with bar 114. Further turning of the barrel then advances the drill stock against the grind wheel to grind the second cutting edge.

Instead of turning the barrel by hand one may release the pin 73 for connecting motor 77. The operator then turns the hand wheel 23 slowly to the right and then to the left, while the drill stock is in slow continuous rotation and is being advanced and retracted by the cam bar 114.

Following the shoulder grinding operations described above, one may proceed to finish grinding the lands of the smaller diameter of the drill stock (assuming such operation has not been carried out before the shoulder grinding operation). This can be carried out by a succession of grinding cuts across each land of the drill on the smaller diameter, while rotary and advancing movement is being imparted to the stock, in the manner previously described.

It is also possible by use of the machine to provide proper relief for the lands as indicated at 174 in Figure 10. In carrying out this operation cam bar 102 is set to a position corresponding to the skew of the drill, pin 73 is disengaged, and the spindle rotated by hand. This results in simultaneus advancement and turning of the drill stock whereby when the grind wheel is properly adjusted, the lands can be relieved to the extent desired.

I claim:

1. In a step type drill grinder, a spindle, a drill holder in alignment with the spindle and splined in driving engagement with the same, spring means for urging the holder toward retracted position relative to the spindle, means for advancing the spindle and holder toward a grinding zone and for simultaneously rotating the spindle and holder at a rate corresponding to the skew of the drill, a releasable clutch in said last named rotating means, manual means for rotation of the holder when said clutch is released, and cam means for independently advancing the holder at a rate corresponding to the cutting edge clearance in response to manual rotation of the same.

2. In a step drill grinder, a machine base, the base being provided with a guideway, a support carried by the guideway for movement in opposite directions, means carried by the base for moving the support along said guideway, a spindle journaled to the support, a drill holder carried by the spindle, a cam bar having one end of the same journaled to the base, said cam bar being adjustable between limiting positions, in one of said limiting positions the cam bar being parallel to the axis of the spindle and in the other limiting position the bar being at an angle to said axis, and drive means serving to operatively connect said cam bar to said spindle, said drive means comprising a sheave carried by the spindle, releasable clutch means for forming a drive connection between said sheave member and said spindle, a second sheave member mounted below the first member and on an axis parallel to the same, drive elements serving to operatively connect said sheave members, a pinion carried by said second named sheave member, a gear rack slidably mounted in said support and disposed substantially at right angles to the axis of the spindle, said gear rack having its teeth operatively engaging the teeth of the pinion, and means forming an operative engagement between said rack and said cam bar.

3. In a step drill grinder, a support, a spindle journaled upon the support, a barrel carried by one end of the spindle, a drill shank holding socket carried by the barrel, means forming a spline drive connection between the barrel and the spindle, whereby the barrel may move longitudinally of the spindle between limiting positions, spring means for normally urging the barrel toward retracted limiting position relative to the spindle, and adjustable cam means for causing projecting and retraction of the barrel relative to the spindle upon rotation of the barrel.

RUSSELL T. MURRAY.

REFERENCES CITED

The following references are of record in the file of this patent:

UNITED STATES PATENTS

| Number | Name | Date |
|---|---|---|
| 2,212,855 | Chittenden | Aug. 27, 1940 |
| 2,452,703 | Umbdenstock | Nov. 2, 1948 |